United States Patent
Vajravel et al.

(10) Patent No.: US 12,406,064 B2
(45) Date of Patent: Sep. 2, 2025

(54) PRE-BOOT CONTEXT-BASED SECURITY MITIGATION

(71) Applicant: Dell Products L.P., Round Rock, TX (US)

(72) Inventors: Gokul Thiruchengode Vajravel, Bangalore (IN); Ibrahim Sayyed, Georgetown, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 17/747,647

(22) Filed: May 18, 2022

(65) Prior Publication Data

US 2023/0418947 A1  Dec. 28, 2023

(51) Int. Cl.
*G06F 21/57*  (2013.01)
*G06F 21/55*  (2013.01)

(52) U.S. Cl.
CPC .......... *G06F 21/575* (2013.01); *G06F 21/552* (2013.01); *G06F 21/554* (2013.01)

(58) Field of Classification Search
CPC ..... G06F 21/575; G06F 21/552; G06F 21/554
USPC ....................................................... 713/164
See application file for complete search history.

(56) References Cited

U.S. PATENT DOCUMENTS

| | | | |
|---|---|---|---|
| 9,251,384 B1* | 2/2016 | Potlapally | G06F 21/82 |
| 9,760,730 B2 | 9/2017 | Vajravel | |
| 9,971,726 B2 | 5/2018 | Vajravel | |
| 11,151,256 B2 | 10/2021 | Martinez et al. | |
| 2010/0050244 A1* | 2/2010 | Tarkhanyan | G06F 21/57 |
| | | | 713/2 |
| 2013/0304944 A1* | 11/2013 | Young | G06F 9/4415 |
| | | | 710/16 |
| 2015/0169879 A1* | 6/2015 | Hagiuda | G06F 11/368 |
| | | | 726/26 |
| 2017/0063895 A1* | 3/2017 | Abuelsaad | H04L 63/105 |
| 2017/0256323 A1* | 9/2017 | Taniuchi | G11C 29/08 |
| 2019/0294800 A1* | 9/2019 | Andrews | G06F 21/602 |
| 2020/0125497 A1* | 4/2020 | Shi | G06F 12/14 |
| 2020/0242253 A1* | 7/2020 | Noel | G06F 21/577 |
| 2020/0310826 A1* | 10/2020 | Liu | G06F 21/572 |
| 2020/0372156 A1 | 11/2020 | Sayyed et al. | |
| 2021/0243245 A1 | 8/2021 | Vajravel et al. | |
| 2022/0311792 A1* | 9/2022 | Nakkabi | H04L 63/0861 |

FOREIGN PATENT DOCUMENTS

WO  WO-2021251950 A1 *  12/2021  ......... G06F 12/0875

* cited by examiner

*Primary Examiner* — Kevin S Mai
(74) *Attorney, Agent, or Firm* — Larson Newman, LLP

(57) ABSTRACT

An information handling system may determine a pre-boot security posture, and update an advanced configuration and power interface mitigation table with the pre-boot security posture. The system may also update a security mitigation table based on a security mitigation policy, and determine a security mitigation based on a protection flag in the advanced configuration and power interface mitigation table and the security mitigation table.

20 Claims, 7 Drawing Sheets

PRE-BOOT CONTEXT-BASED SECURITY MITIGATION

FIELD OF THE DISCLOSURE

The present disclosure generally relates to information handling systems, and more particularly relates to pre-boot context-based security mitigation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may determine a pre-boot security posture, and update an advanced configuration and power interface mitigation table with the pre-boot security posture. The system may also update a security mitigation table based on a security mitigation policy, and determine a security mitigation based on a protection flag in the advanced configuration and power interface mitigation table and the security mitigation table.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
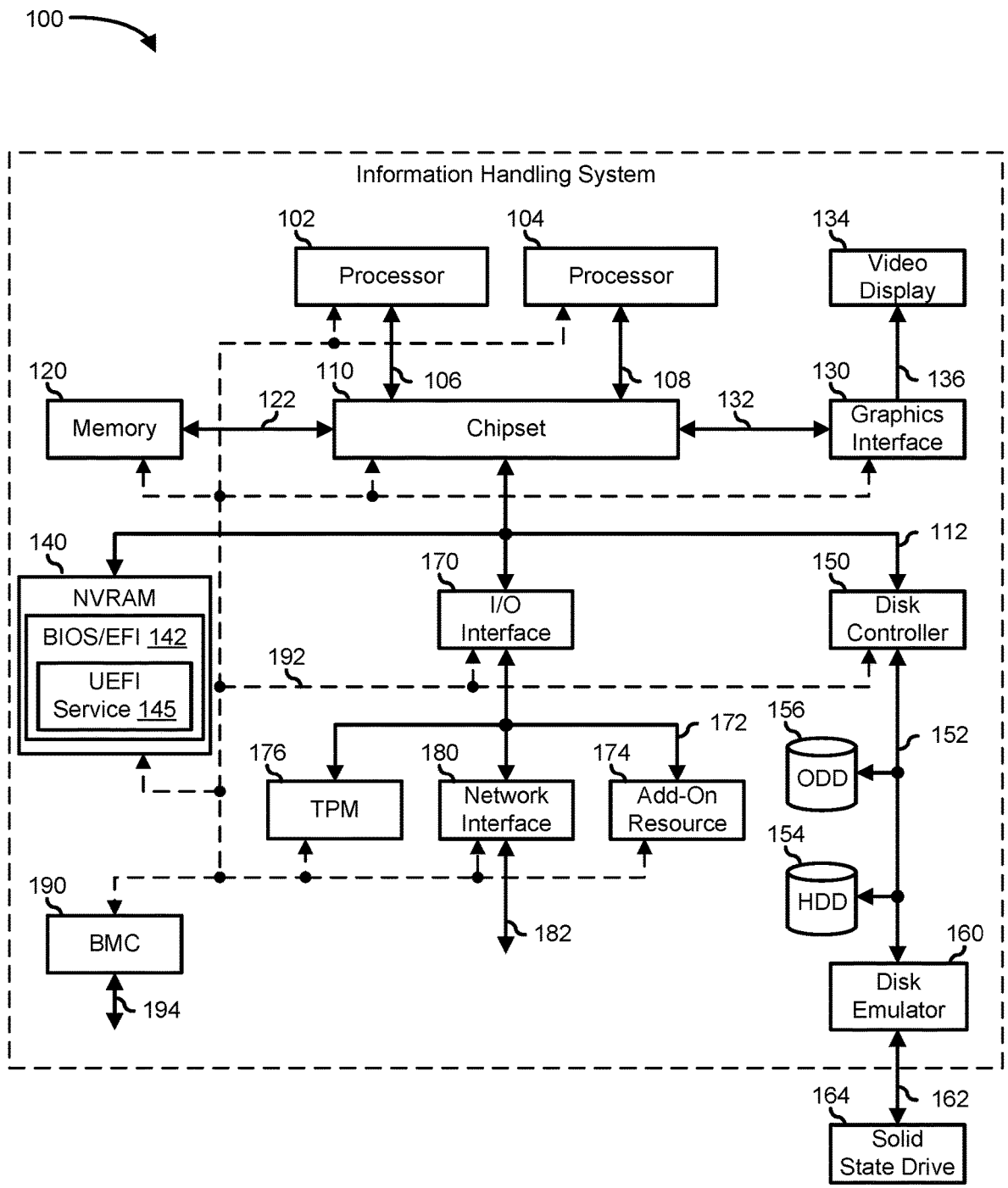
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. In one embodiment, BIOS/EFI module 142 includes a unified extensible firmware interface (UEFI) service 145 to capture the state of BIOS security indicators or pre-boot security indicators. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, and transfers the firmware updates to the NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Threats to the security of an information handling system may require alignment between hardware security and software security techniques to keep users, data, and devices protected. The operating system alone cannot protect an information handling system from the wide range of tools and techniques used by malicious intruders. Once inside the information handling system, intruders can be difficult to detect while they are engaging in nefarious activities from stealing important data or credentials to implanting malware into low-level device firmware that becomes difficult to identify and remove. While there are multiple ways to introduce security threats during the pre-boot stage of an information handling system, there is no comprehensive mechanism to notify the operating system of the information handling systems for context-based mitigation action based on these security threats as disclosed herein. As such the present disclosure includes a system and method with threat intelligence and analytics for a rapid assessment of an attacker's behavior, eviction, and remediation which may prevent a bad actor from gaining access to an information handling system.

Figure 2:
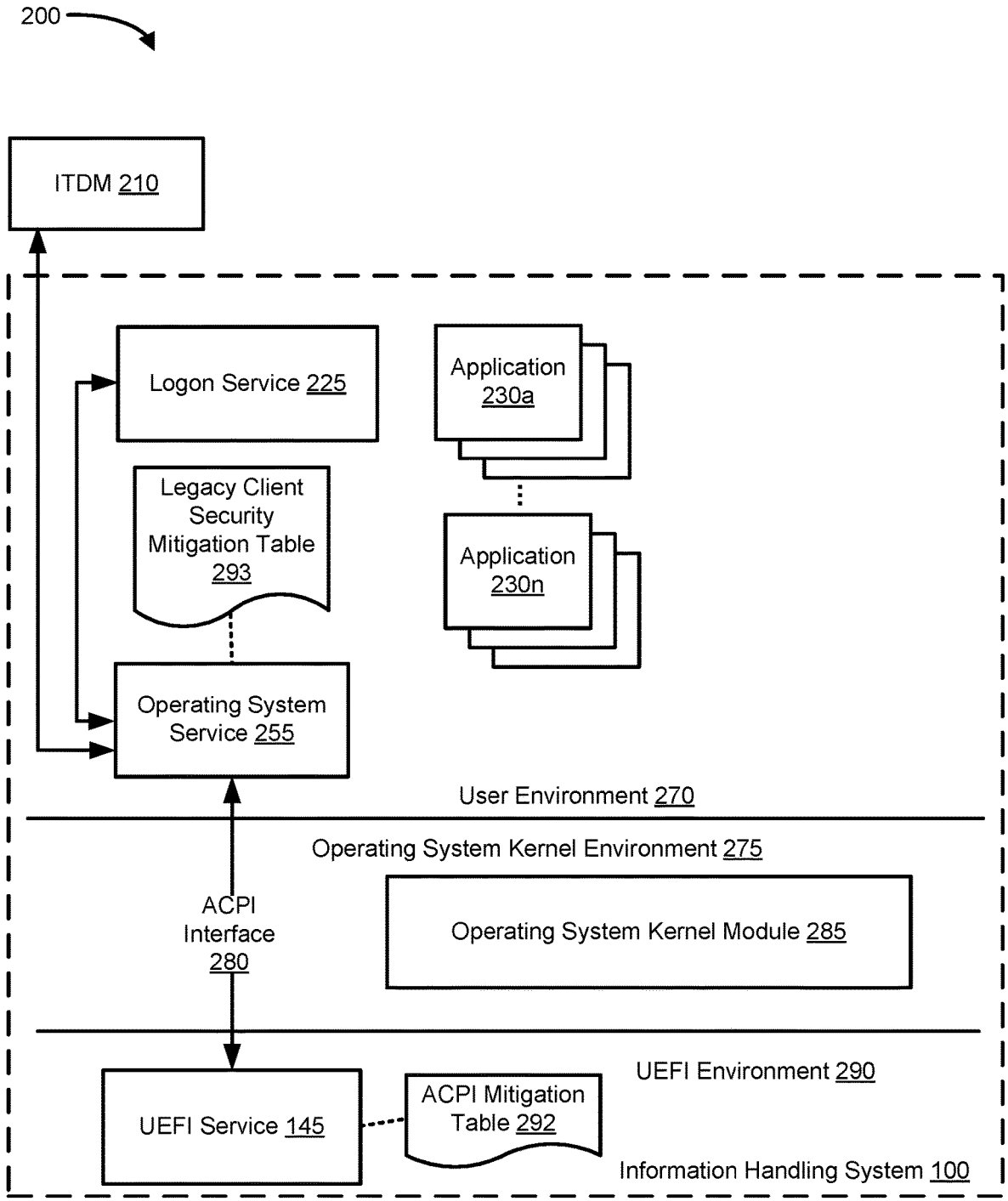
FIG. 2 is a block diagram illustrating an example of a system for pre-boot context-based security mitigation, according to an embodiment of the present disclosure.

FIG. 2 shows a system 200 of a system for pre-boot context-based security mitigation applied to a legacy client and native applications. System 200 may be configured to determine if there is a modification to a resource or a pre-boot indicator of attack (IOA) during a driver execution environment (DXE) phase of a boot process. System 200 may derive context out of IOA and translate such to security mitigations such as choosing authorization levels and application restrictions. System 200 includes an information handling system 100 and information technology device management (ITDM) 210. Information handling system 100 includes a UEFI environment 290, an operating system kernel environment 275, and a user environment 270. UEFI environment 290 includes UEFI service 145 and an advanced configuration and power interface (ACPI) mitigation table 292. Operating system kernel environment 275 includes an operating system kernel module 285. User environment 270 includes a logon service 225, applications 230a-230n, an operating system service 255, and a legacy client security mitigation table 293.

ITDM 210 may be implemented as an enterprise-class device management solution for managing information handling system assets, whether owned by the enterprise, an employee, or an end-user. Functionality performed by ITDM 210 may include over-the-air installation, distribution, and upgrade of enterprise and personal applications, data, and configuration settings for a diverse mix of information handling system types including any suitable type of mobile device. ITDM 210 may be located locally or remotely from information handling system 100. Examples of ITDM 210 include Microsoft Endpoint Manager®, Dell Wyse Management Suite®, or similar. In at least one embodiment, ITDM 210 includes configuration information and/or policy in handling modification to a resource and/or IOA associated with information handling system 100. The policy may include one or more rules in determining the IOA, its corresponding security mitigation, and the application of the security mitigation. ITDM 210 may transmit the configuration information and/or security mitigation policy to operating system service 255, a workspace service, and/or VDI connector during an operating system phase of the information handling system.

UEFI environment 290 represents an operating firmware of information handling system 100 and includes UEFI code, such as BIOS/EFI 142. UEFI code may be operable to detect the resources of information handling system 205, to provide drivers for, to initialize, and to access said resources. These resources may include hardware devices, components, firmware, and software applications such as applications 230a-230n. In line with this, UEFI service 145 may be configured to load early during the boot process and determine the pre-boot security posture of the resources of information handling system 100, such as capture the state of the BIOS security indicators which includes IOAs and update ACPI mitigation table 292 accordingly. The pre-boot security posture of information handling system 100 may be based on one or more parameters or attributes of its resources.

For example, UEFI service 145 may detect whether there is a new external device attached to information handling system 100, whether a pre-determined threshold of a number of BIOS login tries is reached, whether the chassis of information handling system 100 has been opened, whether a new internal device is attached to the information handling system 100 after its chassis was opened, etc. UEFI service 145 may communicate the pre-boot security posture to operating system service 255 via interface 280 which may use the ACPI standard. For example, UEFI service 145 may communicate the pre-boot security posture using Windows® Management Instrumentation™, Open LINUX Management Infrastructure™, etc. This communication may be performed during the boot device selection phase of the boot process.

UEFI service 145 may be configured to capture the state of BIOS security indicators and update ACPI mitigation table 292, which is an ACPI table stored in an ACPI namespace of UEFI environment 290 during the DXE phase of the boot process. ACPI mitigation table 292 includes a protection flag field, also referred to as a security flag, which may indicate the presence of IOA and/or security mitigation. The value of the protection flag field may be used to elect whether to enable and/or disable a security feature. For illustration purposes, a portion of ACPI mitigation table 292 and the associated protection flag table is shown below:

| Field | Byte Length | Byte Offset | Description |
| --- | --- | --- | --- |
| | | | ACPI Mitigation Table |
| Signature | 4 | 0 | Signature of the ACPI mitigation table |
| Length | 4 | 4 | Length, in bytes, of the ACPI mitigation table. |
| Revision | 1 | 8 | A revision number of the ACPI mitigation table |
| Checksum | 1 | 9 | Checksum of the ACPI mitigation table, which may sum to zero |
| OEMID | 6 | 10 | Original equipment manufacturer (OEM) identifier (ID) |
| OEM Table ID | 8 | 16 | Manufacturer model ID |
| OEM Revision | 4 | 24 | OEM revision for supplied OEM table ID |
| Creator ID | 4 | 28 | Vendor ID of the ACPI source language (ASL) compiler utility that created the ACPI mitigation table |
| Creator Revision | 4 | 32 | Revision of the ASL compiler utility that created the ACPI mitigation table |
| Device ID | 4 | 36 | Hardware attested identification (e.g., derived device ID, device rooted ID, seeded consolidation of hardware device IDs, etc.) |
| Protection Flag | 4 | 40 | Container of a bitmask of the system implemented ACPI mitigation protections. Bits in this field represent that certain protections/enforcements are enabled and active for firmware executed inside BIOS The protection flag may also indicate pre-boot security state information of the information handling system, such as an IOA detected. See the protection flag table for a detailed description of this field. |

Protection Flag Table

| Length | Bit Offset | Description |
|---|---|---|
| 1 | 0 | Chassis intrusion detected |
| 1 | 1 | Data wipe detected |
| 1 | 2 | SPI probing detected |
| 1 | 4 | Boot interface (e.g. Thunderbolt ® interface) boot path security disabled |
| 1 | 8 | Boot interruption detected |
| 1 | 10 | UEFI secure boot disabled |
| 1 | 12 | Information handling system booting after a restore/repair attempt . . . etc. |
| 1 | 14 | Secure boot key wipe detected |
| 1 | 18 | Windows system management mode mitigation table disabled |

Operating system kernel environment 275, also referred to as a kernel space, may include core operating system functions that provide a low-level abstraction layer for resources such as processor, memory, and peripherals. In addition, operating system kernel environment 275 may include security attributes and address spaces of an operating system that are typically hidden from user-level applications in user environment 270. Operating system kernel environment 275 may implement one or more operating system kernel modules such as operating system kernel module 285 for managing said resources. Accordingly, operating system kernel module 285 may include APIs, drivers, etc. to manage the interaction between resources in operating system kernel environment 275 and user environment 270 in accordance with a communication protocol. This interaction may be hidden from applications 230a-230n, which are native applications running in user environment 270.

User environment 270, also referred to as a user space, may include applications and non-core operating system functions. In addition, user environment 270 includes operating system service 255 which may be configured as a system startup service and may be loaded during the startup of the operating system. In addition, operating system service 255 may be configured to communicate with UEFI service 145 via interface 280 to receive and/or transmit information regarding the security posture and corresponding security mitigation. The security mitigation may be a function/method or action for the security or integrity of the resources of information handling system 100. Operating system service 255 may be loaded at startup of the operating system prior to logon service 225 and configured to retrieve and cache ITDM configuration and store it in legacy client security mitigation table 293 which is a mapping of pre-boot IOA to one or more legacy client security mitigations. For illustration purposes, a portion of legacy client security mitigation table 293 also referred to herein as table 1 is shown below:

TABLE 1

Client Security Mitigation Table

| Pre-boot Security State Information (via ACPI Mitigation Table) | Recommended Actions from the Operating System Service |
|---|---|
| Chassis intrusion | Notify ITDM<br>Operating system mitigation –> Allow only signed drivers (e.g. Windows Logo Kit ™ signed drivers) for loading; block application instrumentation (e.g App-hooking via Load AppInit); high entropy address space layout randomization |
| Security of boot interface/port is disabled | Disable the boot interface/port (e.g. Thunderbolt/USB-4 port)<br>If the port can't be disabled, block enumerating the devices connected to that port |
| Chassis intrusion + a new internal device is connected | Disable automatic run or automatically play feature of a program or application<br>Operating system mitigation –> Allow only signed binaries; disallow system calls directly to native system services |

Operating system service 255 may be configured to read data stored in ACPI mitigation table 292 via an ACPI read through interface 280, wherein the ACPI Mitigation table may be located in the ACPI namespace of information handling system 100. In particular, operating system service 255 may be configured to determine the status of one or more protection flags in the ACPI Mitigation table and corresponding security mitigation. Operating system service 255 may submit information associated with the security mitigation to the operating system.

As part of the security mitigation, operating system service may provide logon service 225 of a particular logon type and/or credentials to be used by a user to log into information handling system 100. Logon service 225, such as Windows logon service may be configured to authenticate an identity of a user to determine whether the user can log into information handling system 100. For example, logon service 225 may be configured to prompt a user to insert a smart card into a smart card reader associated with information handling system 205. Logon service 225 may then prompt the user to enter a personal identification number instead of a username and password via a graphical user interface. In another example, operating system service 255 may prevent one or more applications 230a-230n from running.

Figure 3:
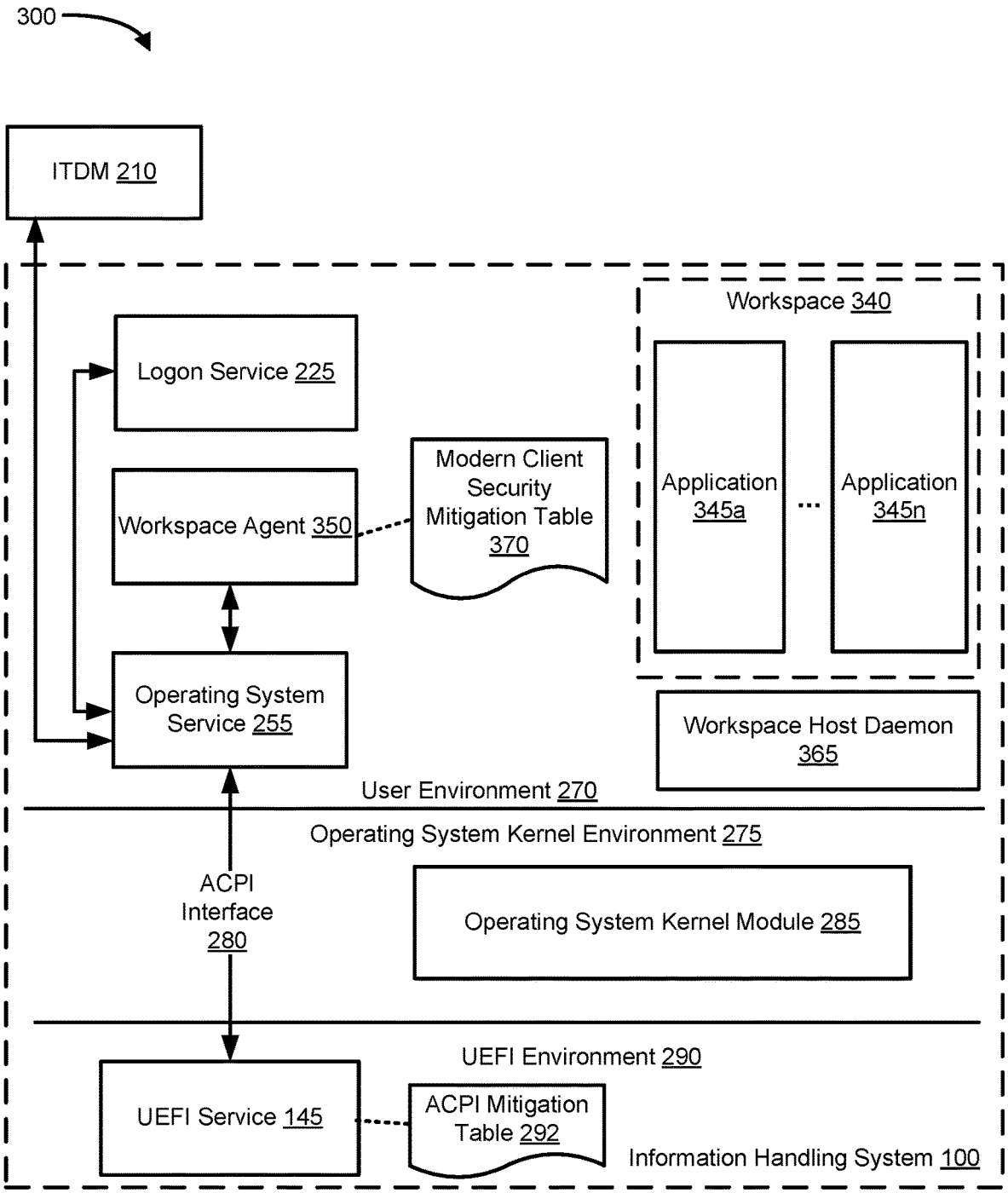
FIG. 3 is a block diagram illustrating an example of a system for pre-boot context-based security mitigation, according to an embodiment of the present disclosure.

FIG. 3 shows a system 300 of a system for pre-boot context-based security mitigation applied to a modern client and isolated native applications. System 300 may be configured to derive context out of pre-boot IOA and translate such to security mitigations such as choosing authorization levels and application restrictions. System 300 includes an information handling system 100 and ITDM) 210. Information handling system 100 includes UEFI environment 290, operating system kernel environment 275, and user environment 270. UEFI environment 290 includes UEFI service 145 and ACPI mitigation table 292. Operating system kernel environment 275 includes operating system kernel module 285. User environment 270 includes logon service 225, operating system service 255, workspace 340, workspace agent 350, workspace host daemon 365, and a modern client security mitigation table 370. Workspace 340 includes applications 345a-345n which are native applications running in isolation inside workspace 340.

Workspace host daemon 365 may be a persistent process that is configured to manage workspace 340. Workspace host daemon 365 may also be configured to support security features of workspace 340 such as workspace encryption, workspace attestation, workspace-to-device anchoring, etc. Workspace host daemon 365 may control operations performed in workspace 340 through interaction with workspace agent 350. Workspace host daemon 365 may issue commands to control the operation of workspace 340 via workspace agent 350. For example, various commands can start or stop workspace 340, perform configuration management, add or remove users to workspace 340, add or remove applications that are isolated in workspace 340, etc.

Workspace 340 may be configured to provide users with secured access to applications 345a-345n. Workspace 340 may be a sandboxed container that provides a secure isolation boundary between the host operating system and the applications 345a-345n which are native applications running inside workspace 340. Examples of workspace technologies include Workspace ONE Intelligent Hub™ from VMWARE, INC. and Dell® Hybrid Client™ from Dell Technologies Inc., Microsoft® HyperV® container, Windows Sandbox™, among others.

Workspace agent 350 may be configured to receive information associated with the pre-boot security posture of information handling system 100 from operating system service 255. Based on the received information, workspace agent 350 may be configured to apply the security mitigation based on a modern client security mitigation table 370 which is a mapping of pre-boot IOA mapped to corresponding security mitigation for a modern client. A modern client may be a client that includes an environment where an application can be run in isolation from the host machine. The security mitigation may also be applied to containerized isolated applications in workspace 340 such as applications 345a-345n. For example, workspace agent 350 may prevent one or all of applications 345a-345n from running/playing in workspace 340. For illustration purposes, a portion of modern client security mitigation table 370 also referred to herein as table 2 is shown below:

TABLE 2

Modern Client Security Mitigation Table

| Pre-boot Security State Information (via ACPI Mitigation Table) | Recommended Actions from the Operating System Service to the Workspace Agent |
|---|---|
| Chassis Intrusion | Disable clipboard and file-sharing across workspace and local applications |
| Security of boot interface/port is disabled | Disable mapping of the devices to the workspaces that are connected via the boot interface/port (e.g. Thunderbolt/USB-4 port) |
| Chassis intrusion + new internal device connected | Migrate workspaces from local machine (virtual machine/container) to cloud |
| | Disable the clipboard and file sharing across workspace and local applications |

Figure 4:
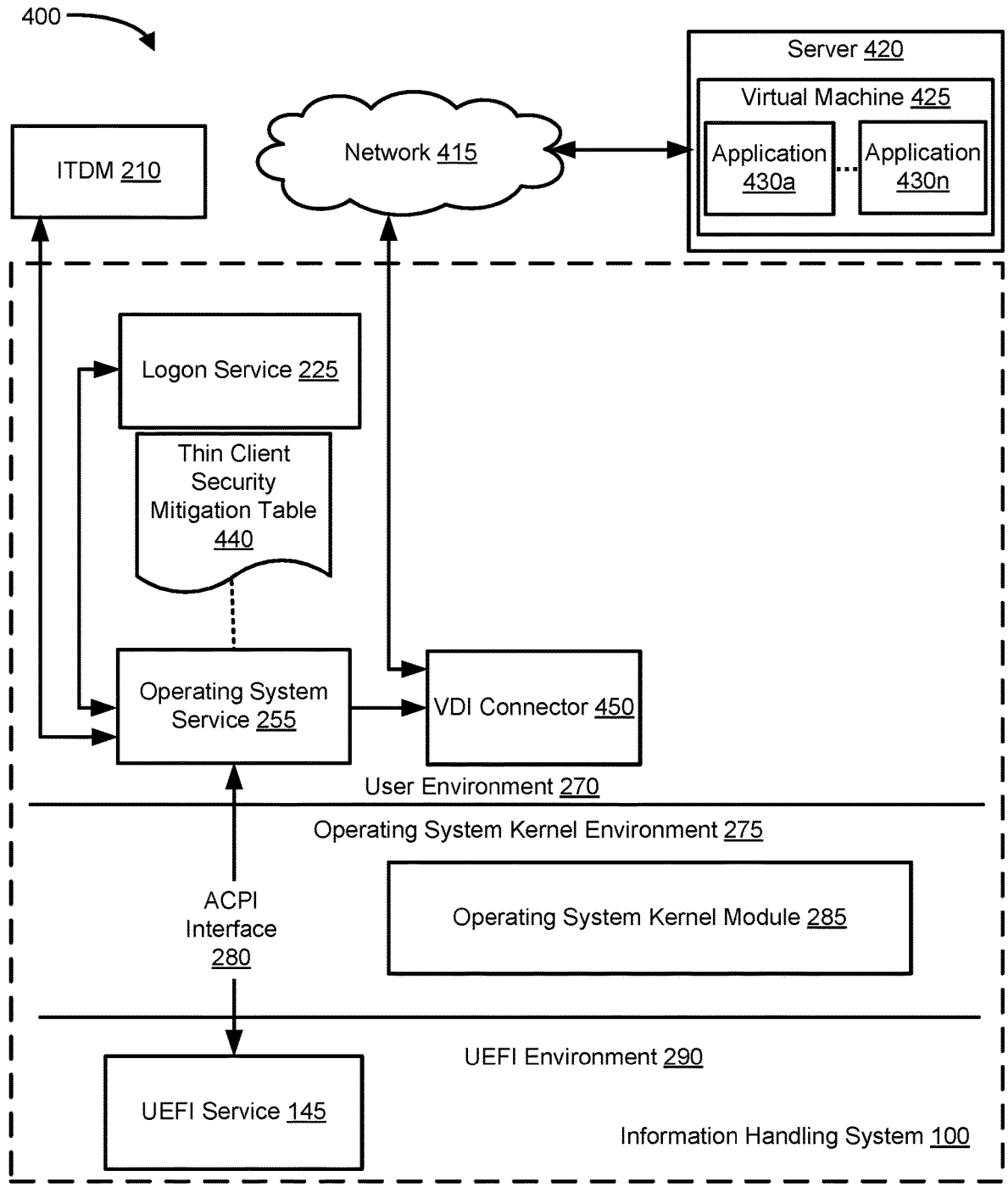
FIG. 4 is a block diagram illustrating an example of a system for pre-boot context-based security mitigation, according to an embodiment of the present disclosure.

FIG. 4 shows a system 400 of a system for pre-boot context-based security mitigation applied to a thin client and cloud-based applications. System 400 may be configured to derive context out of pre-boot IOA and translate such to security mitigations such as choosing authorization levels and application restrictions. System 300 includes an information handling system 100, ITDM 210. Information handling system 100 includes UEFI environment 290, operating system kernel environment 275, and user environment 270. UEFI environment 290 includes UEFI service 145 and ACPI mitigation table 292. Operating system kernel environment 275 includes operating system kernel module 285. User environment 270 includes logon service 225, operating system service 255, a virtual desktop infrastructure (VDI) connector 450, and a thin client security mitigation table 440. Server 420 includes a virtual machine 425 which further includes applications 430a-430n.

VDI environments may include any one or more information handling systems, such as server 420. A virtual environment, such as a VDI, separates a desktop environment and its associated software in a data center or server from the information handling system that is used to access the desktop environment. A "virtual desktop" may refer to any number of methodologies including server-based computing (SBC) where a number of users share the desktop of a server-based operating system, VDI where each user gets their own virtual machine, such as virtual machine 222 which typically runs a client operating system, and application virtualization technologies that concentrate more closely on making specific applications, such as applications 430a-430n, being hosted on a remote system or streamed to the user's local system.

Server 420 may include a hypervisor which is a hardware and/or software component that creates, runs, and manages virtual machines, such as virtual machine 222. Virtual machine 222 is a virtualized instance of a computer that typically runs a client operating system and one or more applications such as applications 430a-430n. Applications 430a-430n may be software-as-a-service (SaaS) applications served to a user over network 415. SaaS can provide a user using a thin client with software and data stored at a remote location. In certain embodiments, network 415 may be a public network, such as the Internet, a physical private network, a wireless network, a virtual private network (VPN), or any combination thereof.

VDI connector 450 may be configured to establish and maintain a remote session with server 420 or virtual machine 425 that hosts applications 430a-430n via network 415. While VDI connector 450 may be a VMWARE HORIZON client, a CITRIX® WORKSPACE APP, a MICROSOFT REMOTE DESKTOP client, etc. In addition, VDI connector 450 may be configured to communicate with operating system service 255 and receive information associated with the pre-boot security posture and corresponding security mitigation to information handling system 100. Operating system service 255 may determine the corresponding security mitigation based on thin client security mitigation table 440. For example, operating system service 255 may direct VDI connector 450 to put virtual machine 425 in restricted mode. For illustration purposes, thin client security mitigation table 440 may be a mapping of thin client security mitigation to pre-boot IOA. For illustration purposes, a portion of thin client security mitigation table 440, also referred to herein as table 3, is shown below:

TABLE 3

Thin Client Security Mitigation Table

| Pre-boot Security State Information (via ACPI Mitigation Table) | Recommended Actions from Operating System Service |
| --- | --- |
| Chassis Intrusion | Notify ITDM<br>Move thin client to kiosk mode (restricted) and allow native VDI connector, not web-based VDI connector<br>Enforce smartcard or two-factor authentication for the VDI login |
| An ACPI table that allows programs to execute every time the information handling system boots, such as Windows Platform Binary Table ™, was moved from disabled to enabled | Operating system mitigation –> Allow only signed drivers (e.g. Windows Logo Kit ™ signed drivers) for loading; block application instrumentation (e.g. App-hooking via Load AppInit); high entropy address space layout randomization<br>Allow only signed native VDI connectors and their plugins are loaded |
| Chassis intrusion + new internal device connected | <All recommended actions of 'chassis intrusion'><br>Disable local drive mapping for the VDI connection/link |

Figure 5:
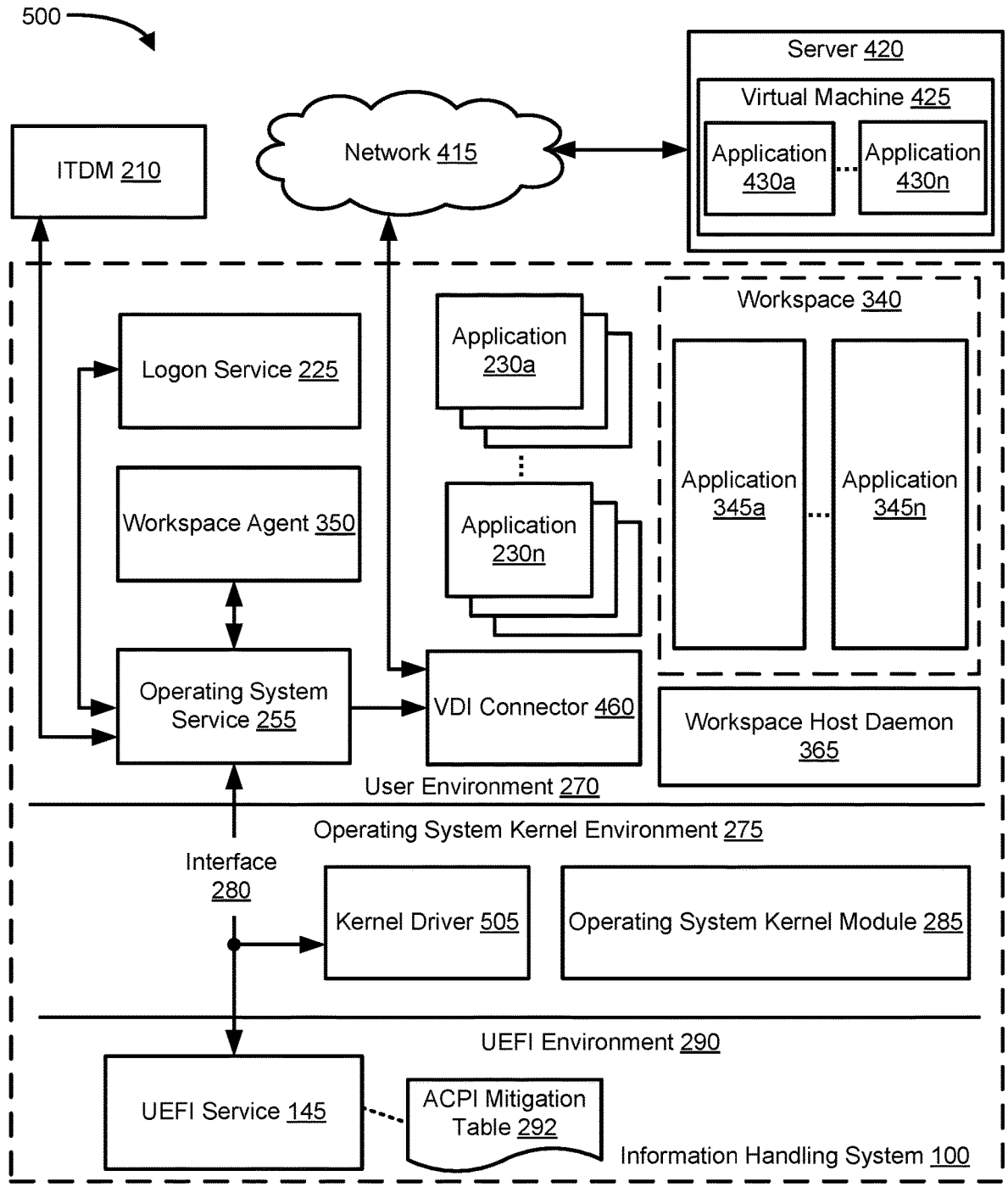
FIG. 5 is a block diagram illustrating an example of a system for pre-boot context-based security mitigation, according to an embodiment of the present disclosure.

FIG. 5 shows a system 500 of a system for pre-boot context-based security mitigation applied to various clients. In this example, system 500 includes features of systems 200, 300, and 400. As such, system 500 may be configured to derive context out of pre-boot IOA and translate such to security mitigations such as choosing authorization levels and application restrictions to legacy, modern, and thin clients accordingly. System 500 includes an information handling system 100, ITDM 210. Information handling system 100 includes UEFI environment 290, operating system kernel environment 275, and user environment 270. UEFI environment 290 includes UEFI service 145 and ACPI mitigation table 292. Operating system kernel environment 275 includes operating system kernel module 285 and a kernel driver 505. User environment 270 includes logon service 225, operating system service 255, workspace agent 350, workspace 340, workspace host daemon 365, VDI connector 450, and a thin client security mitigation table 440. Server 420 includes a virtual machine 425 which further includes applications 430a-430n.

Kernel driver 505 may be installed as a boot-start driver to read and cache ACPI mitigation table 292. Kernel driver 505 may be communicatively coupled to operating system service 255. In one embodiment, kernel driver 505 may receive a request for information in ACPI mitigation table 292 from operating system service 255 instead of retrieving such information instead. This may free operating system service 255 to perform other functions. Kernel driver 505 may also be configured to apply the security mitigation as directed by operating system service 255, such as blocking the Thunderbolt/USB-4 port, blocking device enumeration connected to a certain port, etc.

In various embodiments, information handling system 100 may not include each of the components shown in FIG. 5. Additionally, or alternatively, information handling system 100 may include various additional components in addition to those that are shown in FIG. 5. Furthermore, some components that are represented as separate components in FIG. 5 may in certain embodiments instead are integrated with other components. For example, in certain embodiments, all or a portion of the functionality provided by the illustrated components may instead be provided by components integrated into one or more processor(s) as a system-on-a-chip.

Figure 6:
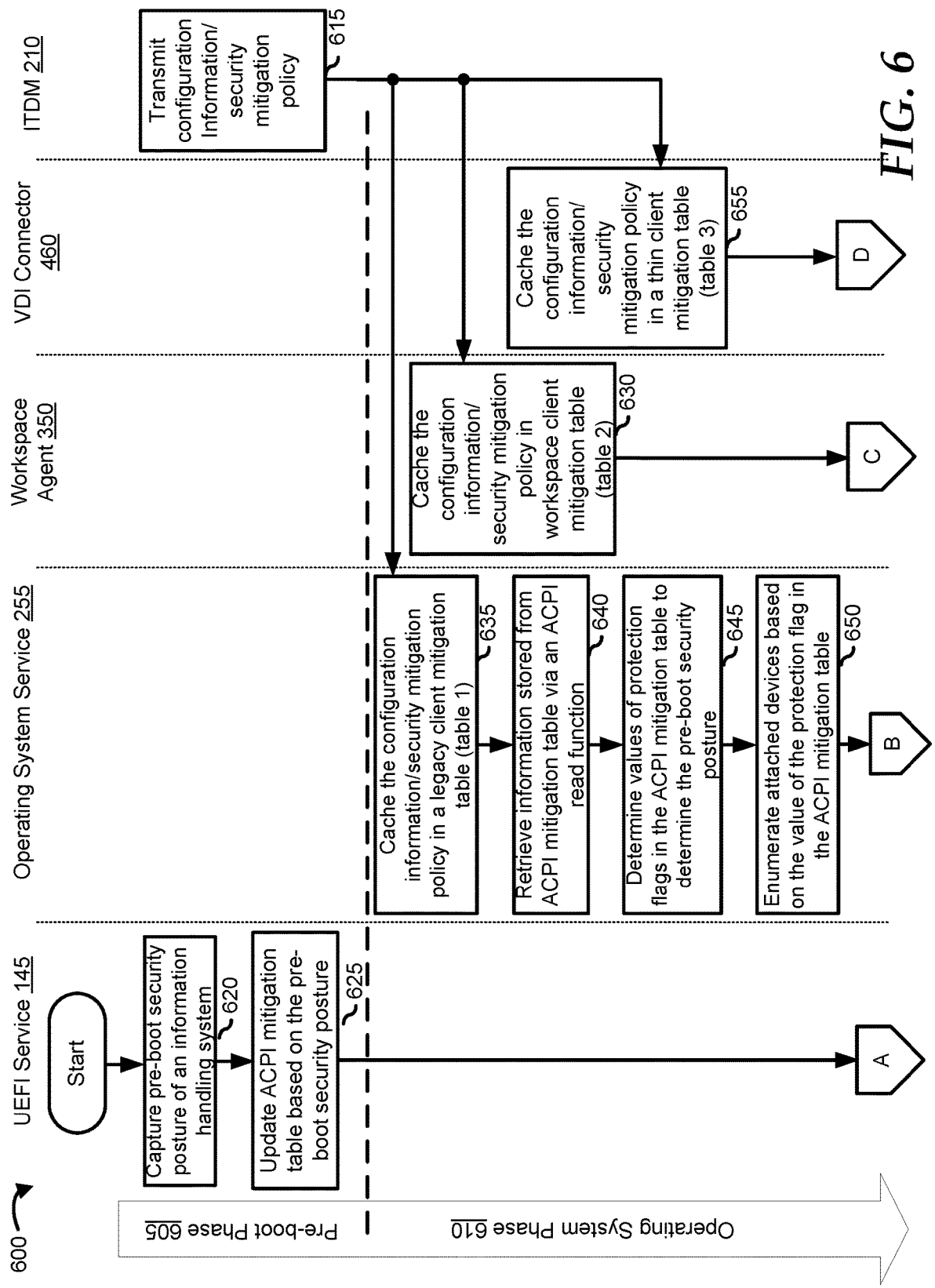
FIGS. 6-7 are flowcharts illustrating an example of a method for pre-boot context-based security mitigation, according to an embodiment of the present disclosure.

FIG. 6 shows a flowchart of a method 600 for pre-boot context-based security mitigation based on the client scenarios of an information handling system. By default, the method may apply the security mitigation based on a security mitigation table, such as table 1. However, the method 600 may also determine whether the information handling system includes a workspace and/or a thin client and apply the security mitigation using table 2 and/or table 3 accordingly. For example, if the information handling system includes a workspace, then the method may apply security mitigation based on a security mitigation table, such as table 1 and/or table 2. Method 600 may take place during pre-boot phase 605 and operating system phase 610. Method 600 may be performed by a UEFI service 145, operating system service 255, and workspace agent 350 of FIG. 5. However, while the embodiments of the present disclosure are described in system 500 of FIG. 5, it should be recognized that other systems may be utilized to perform the described method. One of skill in the art will appreciate that this flowchart explains a typical example that can be extended to advanced applications or services in practice.

Method 600 may be configured to handle IOA in a legacy client, a modern client, and a thin client. For example, a security mitigation, which is operating system agnostic, may be performed on native applications, web applications, containerized applications, and VDI client/connector based on an IOA. At block 615, ITDM 210 may transmit configuration information and/or a security mitigation policy to information handling system. In particular, ITDM 210 may transmit the configuration information and/or a security mitigation policy to operating system service 255, workspace agent 350, and/or VDI connector 460 based on their presence in the system. The configuration information and/or security mitigation policy may be in various formats such as an extensible markup language™, JavaScript Object Notation™, or a similar format. The configuration information and/or a security mitigation policy for a legacy client, a modern client, and a thin client may vary. As such, ITDM 210 may transmit a first configuration information and/or a security mitigation policy to operating system service 255, a second configuration information and/or a security mitigation policy to workspace agent 350, and a third configuration information and/or a security mitigation policy to VDI connector 460.

At block 620, UEFI service 145, which may be inside the PEI/DXE module of BIOS/EFI 142, may capture the pre-boot security posture of information handling system by determining the pre-boot security state of one or more BIOS and/or pre-boot security indicators which includes IOAs during the PEI and/or DXE phase of the boot process. At block 625, UEFI service 145 may update an ACPI mitigation table based on the pre-boot security posture of the information handling system. For example, UEFI service may update the security state of the BIOS and/or pre-boot security indicator(s) and IOA(s). At block 630, workspace agent 350 may receive configuration information and/or security mitigation policy from ITDM 210 and cache it in workspace client mitigation table.

At block 635, operating system service 255 may be loaded during the operating system startup prior to a logon screen. Operating system service 255 may retrieve or receive configuration information and/or security mitigation policy 615 from ITDM 210 and cache it in the legacy client security mitigation table. The legacy client security mitigation table may include a mapping of one or more mitigation actions mapped to an IOA. The mitigation action may include using an operating system method and/or APIs.

At block 640, operating system service 255 may retrieve the information stored in the ACPI mitigation table via an ACPI read function. At block 645, operating system service 255 may determine the pre-boot security posture of the information handling system by reading and/or parsing the retrieved information. For example, operating system service 255 may determine the value of the protection flags in the ACPI mitigation table to determine the pre-boot security posture of the information handling system. Said information may then be cached. The pre-boot security posture may relate to the security status of the external and/or internal devices associated with the information handling system at pre-boot. The pre-boot security posture may also include IOAs associated with the resources of the information handling system.

In addition to the information retrieved from the ACPI mitigation table, operating system service 255 may determine additional IOA via other sources such as trusted platform module platform configuration registers, and health logs from a third party such as Microsoft health attestation, etc. An IOA may be digital or physical evidence that a security attack is likely to occur. Examples of the IOAs include chassis intrusion or disabling of a security feature.

At block 650, operating system service 255 may enumerate external and/or internal devices that are attached to the information handling system based on the value of the protection flags. The method proceeds to block 705 of FIG. 7. At block 655, VDI connector 460 may receive configuration information/security mitigation policy from ITDM 210 and cache it in the thin client security mitigation table.

Figure 7:
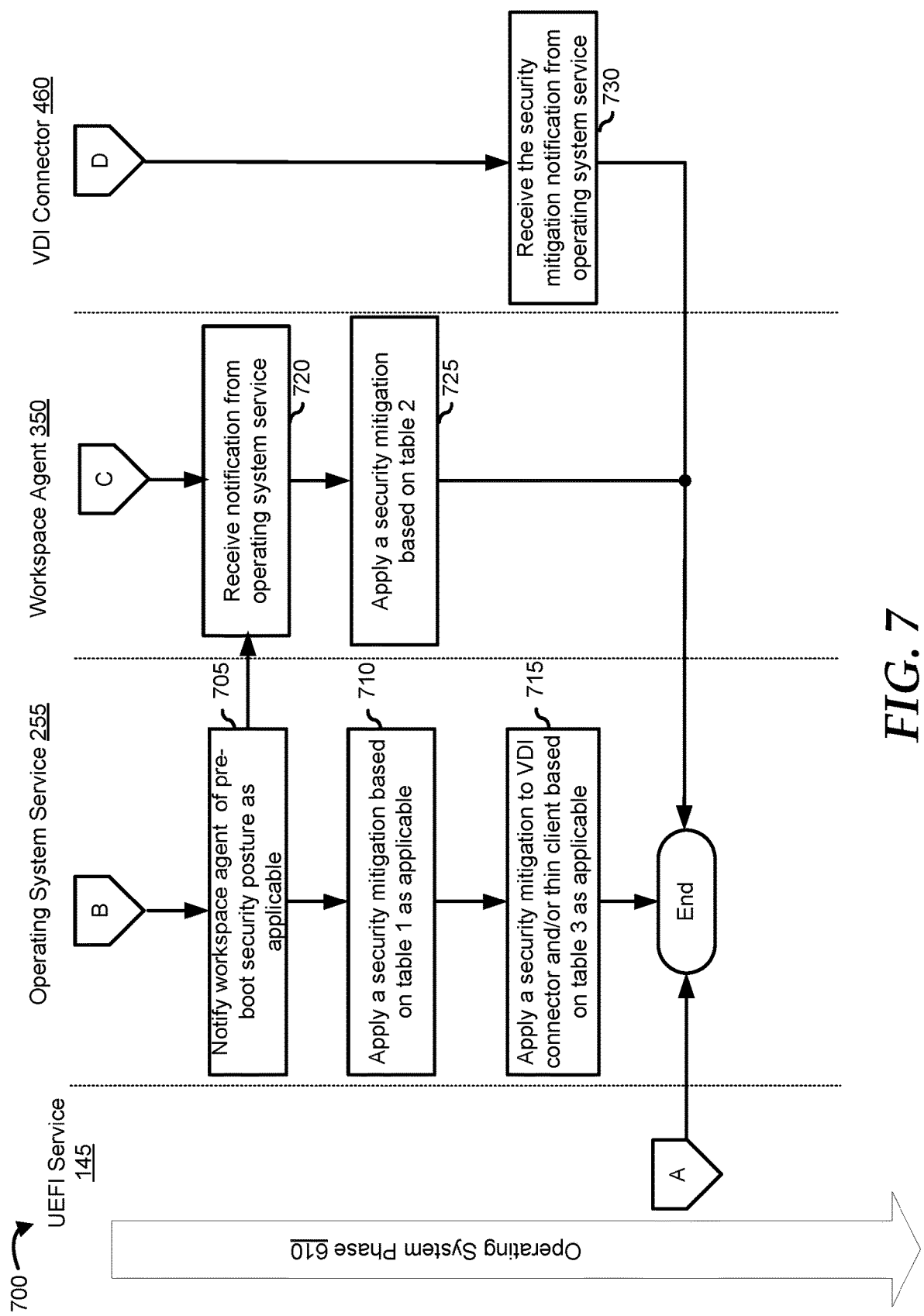

FIG. 7 shows a flowchart of method 700 for the pre-boot context-based security mitigation. Method 700 is a continuation of method 600 of FIG. 6 and may be performed by a UEFI service 145, operating system service 255, workspace agent 350, and VDI connector 460 of FIG. 5. At block 705, operating system service 255, may notify workspace agent 350 of the pre-boot security posture as applicable, such as when the information handling system includes a workspace, such as workspace 340 of FIG. 5. At block 710, operating system service 255 may determine one or more security mitigations based on table 1 and then apply the one or more security mitigations. For example, operating system service 255 may set the logon service type such as requiring the use of a smart card or biometrics instead of a username and password for credentials. As such if there is no information received regarding an IOA, then there may not be a security mitigation to be applied.

At block 715, operating system service 255 may also determine one or more security mitigations based on table 3 as applicable. For example, the operating system service may determine if there is a thin client associated with the information handling system and then determine if there is an IOA associated with the thin client. If there is an IOA, then operating system service 255 may determine corresponding security mitigation. The security mitigation may be applied to VDI connector 460 and/or the thin client. As such if there is no IOA associated with the thin client, then there may not be the security mitigation to be applied to VDI connector 460 and/or the thin client.

At block 720, workspace agent 350 may receive the notification associated with the security posture of the information handling system that is transmitted by operating system service 255. For example, workspace agent 350 may transmit IOAs associated with the workspace. If there is no workspace or there is no IOA associated with the workspace, then operating system agent may not transmit IOA information to workspace agent 350. At block 725, workspace agent 350 may determine corresponding security mitigation to the IOA based on table 2 as applicable. As such if there is no information received regarding an IOA, then there may not be a security mitigation to be applied. At block 730, the VDI connector 460 may receive the security mitigation from operating system service 255. For example, VDI connector 460 may receive a command to block an application running on the thin client and/or the thin client.

Although FIG. 6, and FIG. 7 show example blocks of method 600 and method 700 in some implementations, method 600 and method 700 may include additional blocks, fewer blocks, different blocks, or differently arranged blocks than those depicted in FIG. 6 and FIG. 7. Those skilled in the art will understand that the principles presented herein may be implemented in any suitably arranged processing system. Additionally, or alternatively, two or more of the blocks of method 600 and method 700 may be performed in parallel. For example, blocks 705 and 710 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    determining, by a processor, a pre-boot security posture of an information handling system by capturing state of a basic input/output system (BIOS) security indicator during a boot device selection phase of a boot process, wherein the pre-boot security posture indicates a pre-boot security status of an external device associated with the information handling system;
    updating an advanced configuration and power interface mitigation table based on the pre-boot security posture according to the state of the BIOS security indicator;
    receiving a security mitigation policy;
    updating a security mitigation table based on the security mitigation policy;
    determining a security mitigation corresponding to the pre-boot security posture captured during the boot device selection phase of the boot process, wherein the security mitigation is based on a protection flag in the advanced configuration and power interface mitigation table and the security mitigation table; and
    applying the security mitigation by an operating system to mitigate the pre-boot security status of the external device.

2. The method of claim 1, wherein the determining of the pre-boot security posture is performed during a driver execution environment phase.

3. The method of claim 1, wherein the security mitigation table includes a mapping of an indicator of attack to the security mitigation.

4. The method of claim 1, wherein the security mitigation policy is received from a device management solution.

5. The method of claim 1, further comprising providing a logon type to be used by a logon service of the information handling system.

6. The method of claim 1, wherien the security mitigation is applied to a modern client.

7. The method of claim 1, wherein the security mitigation is applied to a thin client.

8. An information handling system, comprising:
    a processor; and
    a memory coupled to the processor, the memory having program instructions stored thereon that, upon execution by the processor, cause the information handling system to:
        determine a pre-boot security posture of the information handling system by capturing state of a basic input/output system (BIOS) security indicator during a boot device selection phase of a boot process, wherein the pre-boot security posture indicates a pre-boot security status of an internal device of the information handling system;
        update an advanced configuration and power interface mitigation table with the pre-boot security posture according to the state of the BIOS security indicator;
        update a security mitigation table based on a security mitigation policy;
        determine a security mitigation corresponding to the pre-boot security posture captured during the boot device selection phase of the boot process, wherein the security mitigation is based on a protection flag in the advanced configuration and power interface mitigation table and the security mitigation table; and
        apply the security mitigation by an operating system to mitigate the pre-boot security status of the internal device.

9. The information handling system of claim 8, wherein the determination of the pre-boot security posture is performed during a driver execution environment phase.

10. The information handling system of claim 8, wherein the security mitigation table includes a mapping of the pre-boot security posture to the security mitigation.

11. The information handling system of claim 8, wherein the advanced configuration and power interface mitigation table is received from a device management solution.

12. The information handling system of claim 8, further comprising providing a credential type to be used by a logon service of the information handling system.

13. The information handling system of claim 8, wherein the security mitigation is applied to a modern client.

14. The information handling system of claim 8, wherein the security mitigation is applied to a thin client.

15. A non-transitory computer-readable medium to store instructions that are executable to perform operations comprising:
    determining a pre-boot security posture of an information handling system by capturing state of a basic input/output system (BIOS) security indicator during a boot device selection phase of a boot process, wherein the pre-boot security posture indicates a pre-boot security status of an external device associated with the information handling system;
    updating an advanced configuration and power interface mitigation table with the pre-boot security posture according to the state of the BIOS security indicator;
    updating a security mitigation table based on a security mitigation policy;
    determining a security mitigation corresponding to the pre-boot security posture captured during the boot device selection phase of the boot process. wherein the security mitigation is based on an indicator of attack associated with a protection flag in the advanced configuration and power interface mitigation table and the security mitigation table; and
    applying the security mitigation by an operating system to mitigate the pre-boot security status of the external device.

16. The non-transitory computer-readable medium of claim 15, wherein the determining of the pre-boot security posture is performed during a driver execution environment phase.

17. The non-transitory computer-readable medium of claim 15, wherein the security mitigation table includes a mapping of the indicator of attack to the security mitigation.

18. The non-transitory computer-readable medium of claim 15, wherein the advanced configuration and power interface mitigation table is received from a device management solution.

19. The non-transitory computer-readable medium of claim 15, wherein the security mitigation is applied to a modern client.

20. The non-transitory computer-readable medium of claim 15, wherein the security mitigation is applied to a thin client.

\* \* \* \* \*